F. SPROWER.
Brush.
No. 9,160. Reissued April 13, 1880.
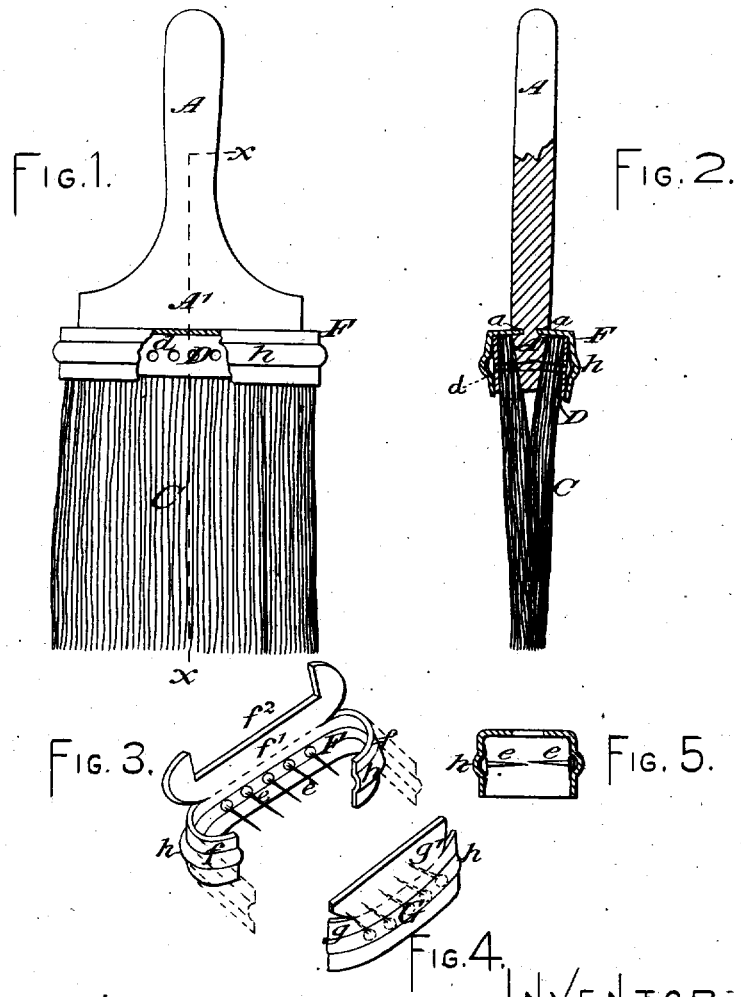
INVENTOR:
Wm. F. Sprower
by his attorney
C. L. Stetson
WITNESSES:
Charles C. Stetson
E. B. Bolton
N. PETERS, PHOTO-LITHOGRAPHER, WASHINGTON, D. C.

UNITED STATES PATENT OFFICE.

FREDERICK SPROWER, OF BROOKLYN, E. D., NEW YORK.

BRUSH.

SPECIFICATION forming part of Reissued Letters Patent No. 9,160, dated April 13, 1880.

Original No. 211,431, dated January 14, 1879. Application for reissue filed August 23, 1879.

*To all whom it may concern:*

Be it known that I, FREDERICK SPROWER, of Brooklyn, E. D., in the county of Kings and State of New York, have invented certain new and useful Improvements in Brushes, of which the following is a specification.

The object of this invention is to secure the ends of the bristles so that when the brush is bent or the point is struck against an object they will be held in place and prevented from slipping up and becoming loosened on the handle.

In the accompanying drawings, forming part of this specification, Figure 1 is a side elevation of a brush provided with my improvement, a portion being broken away. Fig. 2 is a longitudinal section of the same on line *x x*. Figs. 3 and 4 are detail perspective views of the ferrule in process of manufacture, and Fig. 5 is a transverse section of the same with the parts completed and applied together.

Similar letters of reference indicate corresponding parts.

Referring to the drawings, A is the handle of the brush, the lower end of which forms a stock, A′, to which the ends of the bristles C are confined. Around the stock, on a line corresponding to the point where the confined ends of the bristles are placed, is made a deep groove, *a*.

D is the leather band placed around the fixed part of the bristles and securing them to the stock by means of nails *d*, passed laterally through the leather and into the stock A′, as clearly shown in Fig. 2.

Fastening the bristles to the stock by means of the leather band is the method now employed, and my invention has no reference to this part of the construction of the brush; but in the old construction the bristles C are apt to be driven up from the fastening when the brush is bent, or when its end is struck against an object, as is frequently the case when the workman is endeavoring to brush the material into corners, crevices, &c., and as a result thereof the brush loses its evenness, and in a short time becomes useless. My invention is designed to prevent anything of this kind.

The ferrule for protecting the ends of the bristles is shown at F in Figs. 1 and 2 in the position it occupies when placed on the completed brush, and in Figs. 3, 4, and 5 in detail. This ferrule is made in two pieces, F G, in the last figures, and when placed on the brush the two are soldered together, so as to form a whole. The piece F is composed of the side part, *f*, the ends of which are partially bent beforehand, as indicated by the dotted lines in Fig. 3, and are afterward further bent when placed on the brush, to conform to the edges thereof, and the shoulder part *f′*, formed with one side, as shown, with its ends rounded and provided with the rectangular opening $f^2$. This part $f^2$ is bent down to form the end of the ferrule before the ferrule is applied to the brush. The piece G has a similar side, *g*, and a shoulder part, *g′*, arranged, formed, and applied to engage in the groove *a* and to join the corresponding piece of F, and thus form the complete ferrule shown in Figs. 1 and 2.

The sides of the two pieces F and G have a longitudinal bead, *h*, made by striking up the metal, forming a groove on the inside, into which the heads of the nails *e e e*, &c., are placed and secured by solder, as clearly indicated in the drawings.

The mode of applying my improvement is as follows: The bristles C having been secured to the stock in the usual preliminary manner by means of the leather band D, nailed into the stock, as shown in the drawings, the part F is placed over the fixed ends of the bristles on one face of the brush, with the metal along the edge of the rectangular opening $f^2$ inserted in the groove *a*, and the points of the nails *e* pushed through the strap and bristles against the wood of the stock; then the nails *e* are driven into the stock as far as they will go, so that the sides of the ferrule press firmly against the leather strap D. At the same time the shoulder *f′* advances toward the stock, entering the groove *a*, and incases the bristles on one side and ends. The piece G is then applied in the same manner on the opposite side or face of the brush. The ends of the two pieces F G are soldered together, they having been first bent around the edges or corners of the brush and made to conform to them, and, finally, the shoulder parts *f′ g′* and the edges of the ends are soldered together, thus forming a complete ferrule, as shown in Figs. 1 and 2. This ferrule completely incloses the fixed ends of the bristles and firmly locks in the groove *a*, so that the bristles cannot slip, however the brush may be used, and, in addition, they are more securely attached to the stock, as there is a double row of nails driven through the band, and altogether a stronger brush is formed than any now in use.

The ends of the bristles bear against the ferrule; and it makes no difference how the bristles may be borne on, they cannot slip, and it will not be possible for the handle to be driven or worked through the brush so long as the bristles are held together.

Having thus described my invention, I claim as new and desire to secure by Letters Patent—

1. As an improvement in the construction of brushes, the ferrule composed of two parts, F and G, and provided with the corrugation or groove *h* and nails *e*, the heads of said nails being arranged in said groove and soldered to the ferrule-sections, as set forth.

2. In a brush having the bristles confined by a metallic ferrule, the ferrule described, made in two pieces, each with its shoulder part *f′ g′* matched together and applied as herein specified.

In testimony whereof I have hereunto set my hand.

F. SPROWER.

Witnesses:
CHARLES C. STETSON,
THOMAS D. STETSON.